E. T. BOOTH & D. J. ESSER.
GAS REGULATOR AND PURIFIER.
No. 172,696. Patented Jan. 25, 1876.
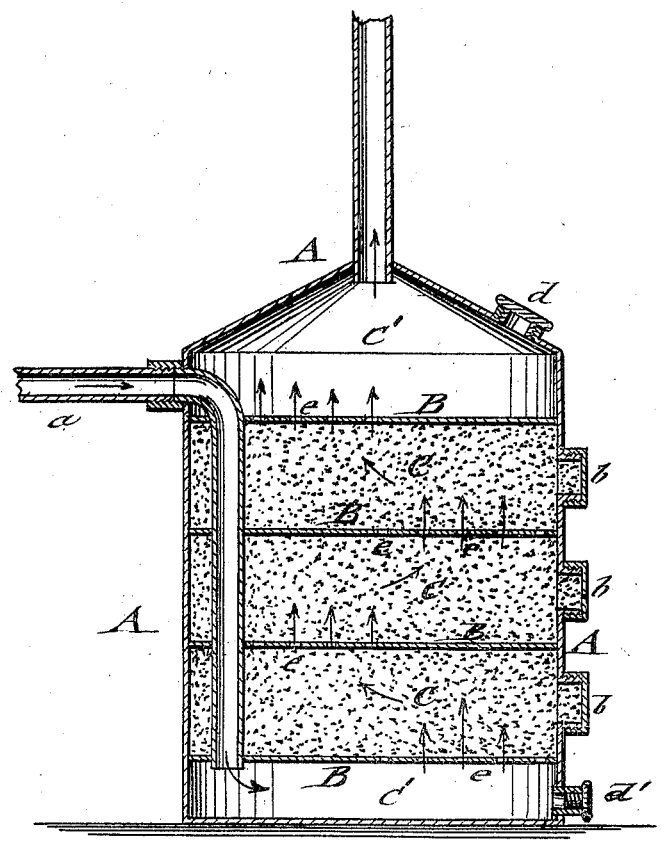
WITNESSES:
E. Wolff
N. T. Terry
INVENTOR:
E. T. Booth and
D. J. Esser
BY Munn
ATTORNEYS.

UNITED STATES PATENT OFFICE.

ELI T. BOOTH AND DANIEL J. ESSER, OF MAUCH CHUNK, PENNSYLVANIA.

IMPROVEMENT IN GAS REGULATORS AND PURIFIERS.

Specification forming part of Letters Patent No. 172,696, dated January 25, 1876; application filed July 10, 1875.

*To all whom it may concern:*

Be it known that we, ELI T. BOOTH and DANIEL J. ESSER, of Mauch Chunk, in the county of Carbon and State of Pennsylvania, have invented a new and Improved Gas Regulator and Purifier, of which the following is a specification:

The accompanying drawing shows part of our improved gas regulator and purifier.

The object of our invention is to provide, for the purpose of producing economy and an even flow of gas, an improved gas regulator and purifier that retains the impure admixture, retains the superfluous carbon particles, and supplies the gas in steady flow to the burners.

The invention consists in using gasoline and charcoal in the purification of gas by arranging it between perforated plates, one of which is over the space wherein the gas enters, and the other just under the space wherein the purified gas is collected before use.

In the drawing, A represents the outer inclosing vessel of our improved gas regulator and purifier, which is made of cylindrical or other shape, and subdivided by horizontal partitions B into a series of chambers, C, that are filled with the filtrating material. The gas from the meter passes through a pipe, $a$, at the upper part of the apparatus down to the bottom chamber C' of the same, which, as well as the top section C', is not filled up with any filtrating material. Any suitable material that admits readily the passage of the gas, and produces the purifying of the same, may be used; but we have found, by experience, that charcoal moistened with gasoline, or a similar product of distillation of petroleum, gives comparatively the most satisfactory results, as it takes up the tar and superfluous carbon and retains the same in solution, preventing thereby the "gumming up" of pipes and burners.

The charcoal is filled and replaced, as required, through side openings $b$ of each chamber, that are hermetically sealed by screw-caps, or otherwise. The gasoline is filled in from an opening, $d$, of the top chamber, percolates through the different chambers by communicating holes $e$ of the partitions, and passes out through an opening, $d'$, of the bottom chamber, so that only a quantity of gasoline sufficient to moisten the charcoal is retained. The top and bottom openings are closed in similar manner as the side openings of the chambers.

One-half of each partition, B, is perforated, but in such a manner that the perforated semi-sections of two adjoining partitions alternate, so that the gas is forced to pass from one side to the other in a meandering course through the chambers, as indicated by arrows in the drawing. The gas is freed from all adhering impurities on its passage through the regulator, and fed evenly to the burners, having increased illuminating power without waste of gas and the emission of impure gases.

Having thus described our invention, we claim as new and desire to secure by Letters Patent—

The combination of pipe $a$, chambers C, containing charcoal and gasoline, and the chambers C' C', the inlets and outlets being arranged substantially as shown and described, for the purpose specified.

ELI T. BOOTH.
DANIEL J. ESSER.

Witnesses:
C. P. TERRY,
DANL. KALBFUS.